Jan. 29, 1974  F. J. ZSOLDOS, JR., ETAL  3,788,982
POOL OF WATER THAT IS RECIRCULATED
Filed Jan. 18, 1972

3,788,982
COLOR CONTROL OF WATER THAT IS RECIRCULATED

Frank J. Zsoldos, Jr., 73 Florence Ave., Denville, N.J. 07834, and Anna Kowalski, 49 Meadowview Ave., Rockaway, N.J. 07866
Continuation-in-part of abandoned application Ser. No. 17,705, Mar. 9, 1970. This application Jan. 18, 1972, Ser. No. 218,712
Int. Cl. B01d 37/02
U.S. Cl. 210—24
7 Claims

ABSTRACT OF THE DISCLOSURE

When water is confined in a large open tank and constantly recirculated through conventional filters as for example in swimming pools and aquariums, problems often arise due to the inadequacy of conventional filters that permit the slow accumulation therein at fractional parts per million levels, of the common heavy metal salts such as those of iron, copper and manganese and also the accumulation of microscopic planktonic algae which proceed to compromise the color and clarity of the water and additionally resulting in the staining of the main tank itself.

This invention adsorbs soluble ferrous, manganous, and cupric salts and planktonic algae from the water by augmenting conventional sand, carbon or diatomaceous earth filters with a special layer of adsorbent material consisting of a mixture of activated alumina and zinc dust. This adsorption is accomplished even in hard water without the concomitant removal of such hardness and thereby refraining from increasing the aggressiveness and corrosiveness of such water as regards the marbelized interiors of swimming pools or the metal plumbing of same.

RELATED PATENT APPLICATION

This application is a continuation-in-part of our copending application Ser. No. 17,705, filed Mar. 9, 1970, now abandoned.

BACKGROUND AND SUMMARY OF THE INVENTION

Swimming pools and aquariums require the continuous maintenance of a clear and colorless water on a recirculated basis. Water color is important here both from the aspects of beauty and the requirement of high underwater visibility. Additionally a colored water may harbor toxic materials and will stain painted pool surfaces. Swimming pools are generally maintained with oxidizing agents such as chlorine, bromine or iodine in conjunction with sand or diatomaceous earth filters, while aquariums must rely solely on carbon sand or diatomaceous earth filters.

The above described maintenance is rendered difficult in that both swimming pools and aquariums are subject to constant water loss via evaporation, requiring necessary makeup additions of new water. The practice gradually increases the dissolved solids content of the water with a concomitant increase of color instigating substances present in the original makeup water such as iron, manganese or copper. Also aquariums and swimming pools are of necessity generally in contact with exposed metal surfaces such as plumbing, filters and pumps. Such exposure invariably results in solution of metals such as iron and copper, particularly when initially exposed to soft water.

The increasing concentration of copper in an aquarium will result in a lethal action on the fish contained therein. As the copper level approaches 0.2 part per million, fish will become ill. Conventional carbon, said or diatomaceous earth filters have only a minor and inadequate effect on this dangerous copper buildup.

Swimming pools that accumulate copper above 0.4 parts per million eventually begin depositing splotches of blue-green stains on their immaculate white surfaces in addition to the green staining of blond human hair. It is a fact green haired children are endemic to copper piped swimming pools.

A second complicating problem of pool maintenance is the occurrence of ferrous and manganous salts in the water of a newly filled pool which soon yield disastrous results when these are initially chlorinated. The ferrous and manganous salts are thereby oxidized to insoluble ferric and manganic forms which rapidly produce ugly splotches of brown on the painted pool surfaces. Additionally these oxidized salts are notorious in their formation of colloids that pass with impunity through conventional filters.

Owing to the volume of water involved in a pool, color effects are grossly magnified. Whereas the U.S.P.H.S. has stated that water containing 15 APHA color units is acceptable for drinking purposes and while 15 color units in water would not produce a perceptible color in a drinking glass, such water at the 8 to 14 foot depth of a swimming pool would appear to be an opaque muddy green. It has been established that as little as 0.10 part per million of colloidal ferric oxide will render a previously sparking blue pool water an unappealing dull green. In terms of the previously described APHA color units, a color greater than one-half unit will noticeably alter the color of the water toward various shades of green.

Pure water is colorless but normally appears blue when present in a swimming pool for the same reason that the daytime sky appears blue; that is the scattering of the blue end of the light spectrum. The colloidal presence of ferric oxides, manganic oxides and cupric oxides will cause a blending of various brown colors with the blue to yield a dull olive drab.

Swimming pool surfaces that stain as previously described usually remain stained for the duration of the swimming season because the only manner of removal to date is through the dissolving action of strong hydrochloric acid. This of course dictates that the pool be emptied, acid washed and refilled with fresh water with no assurance that the second attempt will not stain again.

Another significant source of color problem in pools and aquariums is through the establishment therein of planktonic microscopic algae. Due to the open nature of pools and aquariums these waters are readily seeded via airborne algal spores resulting in extensive blooms that render the water an opaque green. These microscopic organisms readily pass through existing filters. In swimming pools recourse is usually made to the application of algaecidal chemicals; however such application is precluded in the case of aquariums lest a lethal action be exerted on the fish. However, even when algaecides are used, the dead algae continue to pass throug the filter leaving the water dull and unappealing.

This invention provides an effective method for removing the heavy metals iron, manganese and copper along with planktonic algae whenever present. The invention includes an activated alumina-zinc dust mixture and a method for controlling the color of water in pools and aquariums and to prevent pools from staining and to keep human hair from discoloring because of the minute presence of the aforesaid substances.

Other objects, features and advantages of the invention will appear or be pointed out as the description proceeds.

BRIEF DESCRIPTION OF DRAWING

In the drawing, forming a part hereof, in which like reference characters indicate corresponding parts in all the views.

DESCRIPTION OF PREFERRED EMBODIMENT

Figure 1:
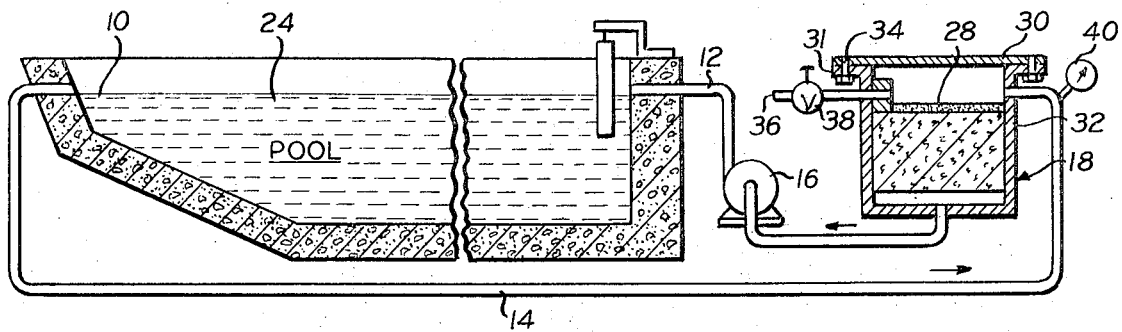
FIG. 1 is a diagrammatic illustration of a swimming pool with a filter and means for recirculating water continuously from the pool through a filter and back to the pool.
Figure 2:
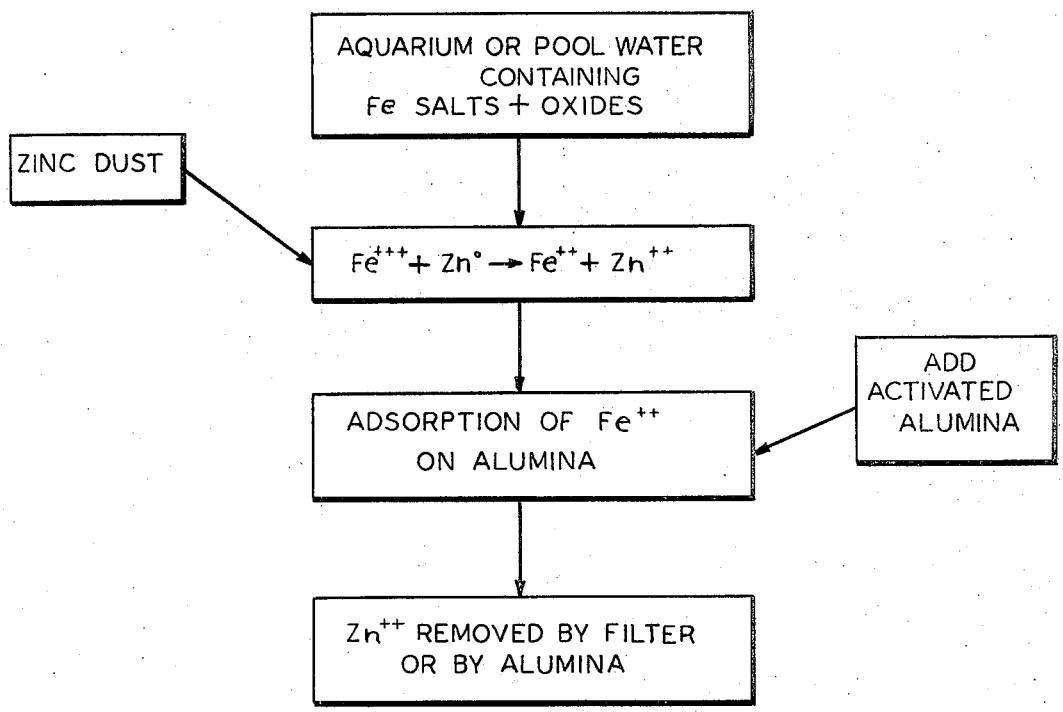
FIG. 2 is a diagrammatic showing of the successive steps in the control of water of a swimming pool, in accordance with the method of this invention.

The swimming pool assembly shown in FIG. 1 includes a pool 10 to which water is supplied through piping 12. Water is withdrawn from the pool through drain piping 14. A pump 16 maintains continuous circulation of the water as it is withdrawn and supplied back to the pool; and there is a filter 18 through which the water passes as it makes its cycle from the drain or skimmer piping 14 and back to the pool through the inlet piping 12. The apparatus thus far described is a conventional system.

The water is designated in FIG. 1 by the reference character 24. A mass of metal powder 28 is shown covering the top surface of the filter 18 so that the metal powder 28 is in the path of the water which passes through the filter. This metal powder 28 is activated alumina, mixed with some zinc powder. Where a pool is contaminated with ferric oxide, the use of the metal powder 28 in the filter housing is effective to bring the ferric oxide under control quickly. The principle of operation will be explained as the description proceeds.

The housing of the filter 18 may be of a conventional construction and in the illustrated embodiment it includes a cover 30 secured to a flange 31 around the upper end of a fixed housing 32 and detachably connected with the fixed housing 32 by a ring of bolts 34. Make-up water is supplied through a water pipe 36 having a shut-off valve 38.

Conventional practice upon first filling a swimming pool is to add soda ash and an oxidizer (chlorine) to the water, even as it is filling. This treatment will render the pool a reaction chamber wherein a previously clear blue water will have its colorless soluble heavy metal content (ferrous, manganeous) turning the beautiful water into an ugly brown to green dull mass.

The walls and floors of the pool reactor are now of course placed in jeopardy for the reacted metals will readily cement themselves to these surfaces, resulting in brown iron stains, black managanese stains or green copper stains. As if this were not enough of an insult to the system, an additional burden exists in the fact that these reacted metals are gelatinous in form and as such are filter pluggers of the first degree. Lastly, the settling mass covers the pool floor and presents a vacuuming task of great difficulty.

Conventional alternatives to the above are the additions of one of the alums to the pool. Such floccing of the water will ameliorate the staining problem, however, the filter plugging is accentuated and the vacuuming becomes even more difficult as the floc adds its gelatinous bulk to an already badly overburdened situation.

A more recently introduced procedure avoids filter plugging and vacuuming problems by adding a chelate to the water. However, this treatment merely holds the reacted metal in solution and in a situation where it is constantly accumulating, the yellow colored iron chelate will soon discolor the water. The chelate is furthermore ineffective in redissolving iron that has already turned the water brown.

In strong contrast to all such conventional practice, the rationale of the instant invention utilizing an activated alumina-zinc dust filter-aid system is to avoid converting the swimming pool into a reaction vessel from the very outset. Ii lieu of rendering clear-blue water brown with oxidizer, the water is directed instead across a bed of adsorbent filter aids that selectively removes soluble iron salts from the water in its original un-oxidized state. The reducing action of zinc tends to maintain the iron in its colorless ferrous form thus giving the alumina coated filter more time for its adsorption. Chemically speaking, iron is removed from the water in its clear, colorless ferrous form via absorption on an activated almuina-zinc dust media of excellent hydraulic properties from whence it is simply backwashed to waste.

In effect, the staining form of iron is never produced out in the pool. As a consequence bottom vacuuming is greatly eased, filter plugging is virtually eliminated and pool staining is stopped.

Manganese and copper are removed in a manner similar to iron.

In actual practice, upon initially filling the pool 10, the water is added through the filter 18 which has been precoated with an activated alumina-zinc dust filter aid 28. Additionally, upon being filled, the pool water is to be recirculated by the pump 10 through the filter-aid 28 for at least several pool turnovers. All this is to be done before any chemicals whatsoever are added to the pool. As a final precaution, exhausted filter-aid is backwashed off the sand bed of the filter 18 and a fresh charge of alumina-zinc 28 is added just prior to initiation of chemical treatment, as with chlorine.

Although the filter aid 28 of the instant invention can be kept continuously on the sand bed, it is recommended only in those instances of severe recurrent contamination such as for example copper plumbed swimming pools and pools located in areas containing iron in their makeup water or whose filter systems are in an advanced stage of corrosion.

As regards the mechanics of use. A slurry of the alumina-zinc is prepared by mixing the powder with pool water. With the filter pump 16 running, the slurry is slowly poured into the skimmer piping 14. When a pressure gauge 40 on the inlet into the filter begins to register a pressure increase the addition is stopped. In any case no more than two pounds of filter aid is added to a two foot diameter filter at any one time.

The filter is to be left running continuously for two or three complete pool water turnovers after addition, then backwashed.

Diatomaceous earth filters should be backwashed and charged with half the usual amount of earth before charging with alumina-zinc filter aid.

A more rapid clearing of the water can usually be achieved by pouring the alumina-zinc slurry all around the pool itself. This procedure is to be used when the pool water has already been turned brown by the addition of chemicals. It is a rapid emergency treatment that will result in some necessary bottom vacuuming. However, the sand-like absorbent represents a comparatively easy vacuuming task when compared to the will-o-the-wisp conventional alum floc.

The alumina-zinc filter aid mixture is prepared by dry blending powdered activated alumina with zinc dust. The preferred percentages of alumina and zinc are:

|  | Percent |
|---|---|
| Activated alumina | 98 |
| Zinc dust | 2 |

However, these percentages are not critical and can be varied over a relatively broad range. Mixtures with greater amounts of zinc dust have greater effectiveness as regards plankton removal while the activated alumina is more effective against the metals. The preferred range is from 50% activated alumina and 50% zinc dust to 99.5% activated alumina and .5% zinc dust.

The following tests were performed by way of demonstrating the effectiveness of the proposed filter aid as compared to conventional materials.

Example I.—Removal of copper: Swimming pool

A swimming pool with extensive copper piping was found to contain 0.6 parts per million copper in the water. The pool had been regularly treated for years with calcium hypochlorite and had been constantly filtered through diatomaceous earth. The pool surface exhibited blue staining and a light haired child of the pool owner had a green cast to his hair.

The diatomaceous earth was washed out of the filter and a mixture of 98% of activated alumina and 2% zinc dust was put back in its stead. The filter was operated continuously and after one week's time the copper content of the water was reduced to 0.2 p.p.m. A second treatment reduced the copper to 0.1 p.p.m. A bimonthly treatment thereafter with the alumina-zinc kept the copper at this level.

Example II.—Removal of copper: Aquarium

A 20 gallon aquarium tank whose water was filtered through activated carbon and dacron wool was sampled for copper. The test showed the presence of 0.3 p.p.m. of copper in the water. An inquiry established that the tank received regular additions of tap water that came through a copper plumbed system. The charcoal-dacron filter was left intact and a mixture of 99.5% activated alumina and 0.5% zinc dust was placed on top of the existing filter media.

Within a week's time the copper content of the water was reduced to 0.05 p.p.m.

Example III.—Removal of plankton: Laboratory

Swimming pool water containing plankton algae was obtained and divided into six one-liter portions. Flask A received no further additions and was reserved as the blank control. Each of the other flasks received 20 mg. increments of filtration media; activated alumina, activated alumina-zinc dust, zinc dust, activated carbon, diatomaceous earth. All flasks were agitated for 10 minutes and then filtered through Whatman 40 filter paper. The filtrate was then tested for color on a Helige Comparator. The results are recorded in APHA color units.

| Material: | Color (due to presence of algae) |
|---|---|
| Blank control (most color) | 6 |
| Diatomaceous earth (celite) | 4 |
| Activated alumina | 3 |
| Activated carbon | 1 |
| Zinc dust | 1 |
| Activated alumina-zinc dust (50–50 mix) (least color) | ½ |

Remarks: The mixture of the instant invention was superior.

Example IV.—Removal of copper: Laboratory

A special sample of hard water was prepared containing 400 p.p.m. hardness (calcium) with 2.5 p.p.m. copper at a neutral pH. The solutions were separated into six portions and treated as in the preceding example. The results are as follows:

| Material: | Total copper, p.p.m. |
|---|---|
| Blank control (no removal) | 2.4 |
| Diatomaceous earth (celite) | 2.4 |
| Activated carbon | 0.8 |
| Activated alumina | 0.15 |
| Activated alumina-zinc (50–50 mix) (high removal) | 0.05 |

Remarks: The filter-aid of the instant invention is superior.

Example V.—Ferrous removal: Laboratory

A laboratory-prepared sample of ferrous iron water was prepared as in the preceding manner and treated accordingly.

| Material: | Total iron, p.p.m. |
|---|---|
| Control blank (no removal) | 1.8 |
| Diatomaceous earth (celite) | 1.3 |
| Activated alumina | 1.0 |
| Activated carbon | 0.1 |
| Activated alumina-zinc (50–50 mix) (high removal) | 0.0 |

Remarks: The filter aid of the instant invention is superior.

Example VI.—Manganous removal: Laboratory

| Material: | Total manganese, p.p.m. |
|---|---|
| Blank control (no removal) | 1.9 |
| Diatomaceous earth (celite) | 1.8 |
| Activated carbon | 0.9 |
| Activated alumina | 0.4 |
| Activated alumina-zinc (50–50 mix) (high removal) | 0.1 |

Remarks: The mixture of the instant invention is superior.

Example VII.—Ferric (colloidal) removal: Laboratory

A water containing colloidal ferric salt was prepared as in the preceding manner and treated accordingly. The results are as follows:

| Material: | Total iron, p.p.m. |
|---|---|
| Blank control (no removal) | 0.7 |
| Diatomaceous earth (celite) | 0.5 |
| Activated carbon | 0.1 |
| Activated alumina | 0.1 |
| Activated alumina-zinc (high removal) | 0.0 |

Remarks: The mixture of the instant invention is superior.

The excellent effectiveness of the filter aid of the instant invention is made readily apparent in the preceding experiments. Also vital to the nature of the filter aid is the ability to function without the concomitant softening of the water. Soft water would dissolve lime based finishes of swimming pools and would be actively corrosive as regards the pool plumbing. The deposition of modicum amounts of calcium scale in pool pipes is an anti-corrosion feature.

An anti-corrosion feature of the instant invention is inherent in the use of zinc dust. While activated carbon is an efficient remover of iron from water its corrosive effect on pool plumbing would put as much metal back into the water as it takes out.

The preferred embodiment of the instant invention has been illustrated and described, but changes and modifications can be made and some features can be used in different combinations without departing from the invention as defined in the claims.

What is claimed is:

1. A water color, stain and toxicity control system for swimming pool, aquarium and other water that is recirculated, including in combination a vessel in which the water is held, a filter through which water is supplied to the vessel, and an adsorbent on the filter for adsorbing ferrous, manganous and cupric salts and planktonic algae when present in the water, said adsorbent on the filter being a mixture of activated alumina adsorption agent and zinc dust.

2. The color, stain and toxicity control system described in claim 1 characterized by passages through which the water flows from the vessel and back to the vessel, a filter through which the water passes during its flow through said passages, a pump in one of said passages and the adsorbent on the filter, for adsorbing ferrous, manganous and cupric salts and planktonic algae when present in the water, leaving the water with its calcium hardness that may also be present in the water.

3. The water control system described in claim 1 characterized by the adsorbent on the filter being effective for adsorbing ferric and manganic salts when present in the colloidal stage.

4. The water control system described in claim 1 characterized by said filter also having a holder for a conventional sand, diatomaceous earth, anthracite or activated carbon filter.

5. The water control system described in claim 1 characterized by said adsorbent on the filter including activated alumina and zinc dust in a ratio of from substantially equal amounts of the alumina and zinc dust to a ratio of 99.5% alumina and 0.5% zinc dust.

6. The water control system described in claim 1 characterized by said adsorbent on the filter including zinc dust in an amount greater than from 0.5%.

7. A method of controlling color, stain and toxicity of swimming pool, aquarium and other water that is recirculated, comprising pouring an adsorbent consisting of activated alumina adsorption agent and zinc dust throughout the main body of water in a vessel as a free mix aqueous slurry, and pumping said slurry from the vessel through a filter until the adsorbent is deposited and forms a layer of said adsorbent on the filter, passing the recirculated water through the filter to adsorb ferrous, manganous and cupric salts and planktonic algae present in the water.

References Cited
UNITED STATES PATENTS

| | | | |
|---|---|---|---|
| 3,532,217 | 10/1970 | Richards | 210—169 |
| 3,235,489 | 2/1966 | Bell et al. | 210—75 X |
| 1,990,214 | 2/1935 | Zapffe | 210—50 |
| 3,043,771 | 7/1962 | Bloch | 210—24 X |

SAMIH N. ZAHARNA, Primary Examiner

I. CINTINS, Assistant Examiner

U.S. Cl. X.R.

210—60, 63, 75, 169, 38; 252—475